C. H. PECK.
TRACTOR.
APPLICATION FILED MAR. 15, 1919.

1,348,315.

Patented Aug. 3, 1920.
3 SHEETS—SHEET 2.

Fig. 2

Inventor
Charles H Peck

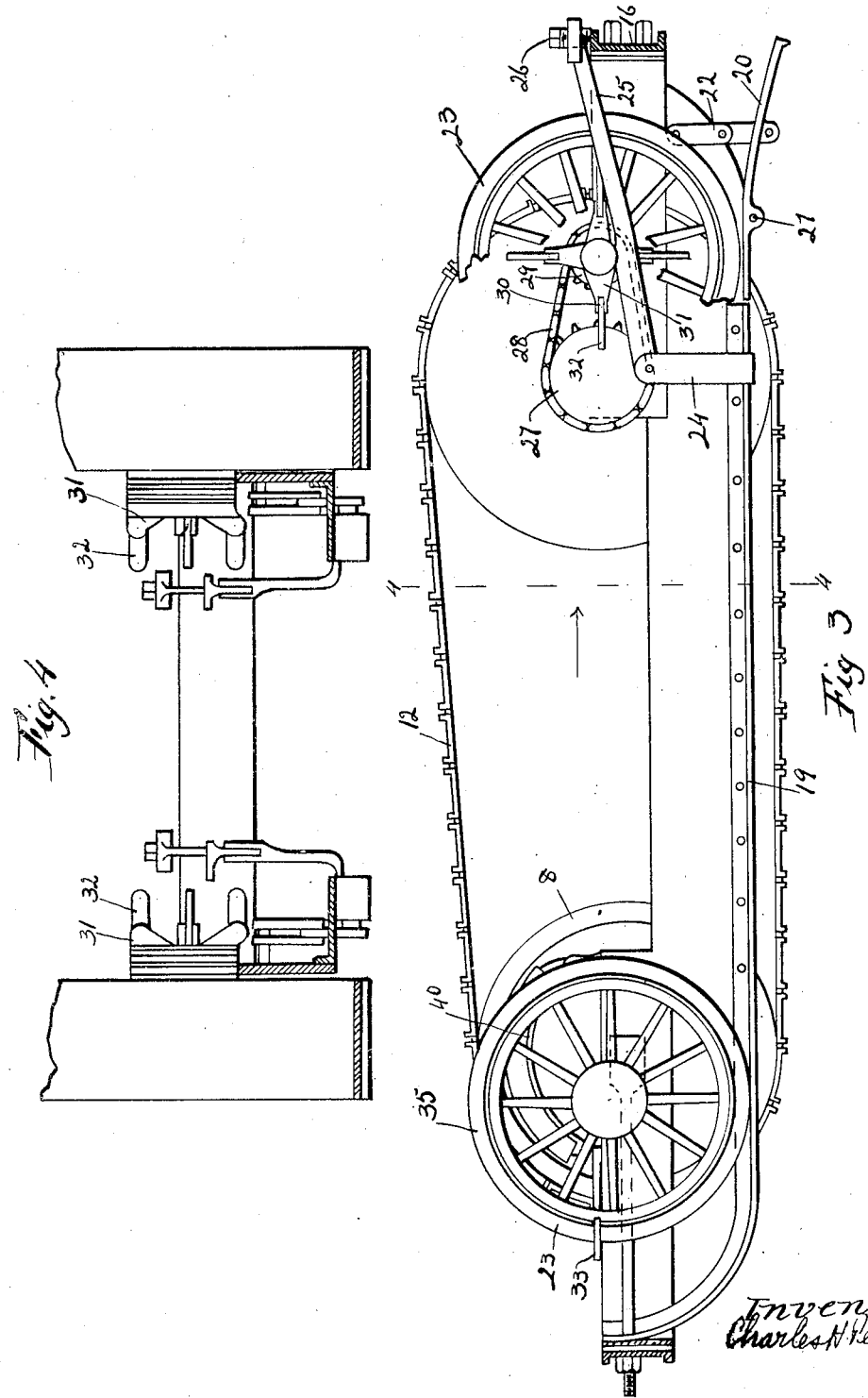

UNITED STATES PATENT OFFICE.

CHARLES H. PECK, OF PHILADELPHIA, PENNSYLVANIA.

TRACTOR.

1,348,315.     Specification of Letters Patent.     Patented Aug. 3, 1920.

Application filed March 15, 1919. Serial No. 282,843.

*To all whom it may concern:*

Be it known that I, CHARLES H. PECK, a citizen of the United States, residing at Philadelphia, in the county of Philadelphia and State of Pennsylvania, have invented new and useful Improvements in Tractors, of which the following is a specification.

My invention relates to new and useful improvements in tractors, and has for its object to so construct a tractor that an ordinary automobile may be run thereon for supplying the motive power.

A further object of my invention is to construct the tractor in self-laying track units so that it may be adjusted to fit any length or size of automobile.

A further object of my invention is to provide for coupling the steering wheels of the automobile to the steering mechanism of the tractor so that the ordinary steering mechanism of the automobile may be utilized for guiding said tractor.

A still further object of my invention is to provide means for running an automobile on to the tractor, and then freeing the drive wheels of said automobile.

With these ends in view, my invention consists in the details of construction and combination of elements, hereinafter set forth and then specifically designated by the claims.

In order that those skilled in the art to which this invention appertains, may understand how to make and use the same, I will describe its construction in detail referring by numerals to the accompanying drawings forming a part of this application, in which:—

Fig. 2, is a side elevation thereof.

Fig. 3, is a central longitudinal section showing the location of an automobile thereon by the front and rear wheels thereof in dotted lines, and, Fig. 4, is a section at the line 4—4.

Figure 1:
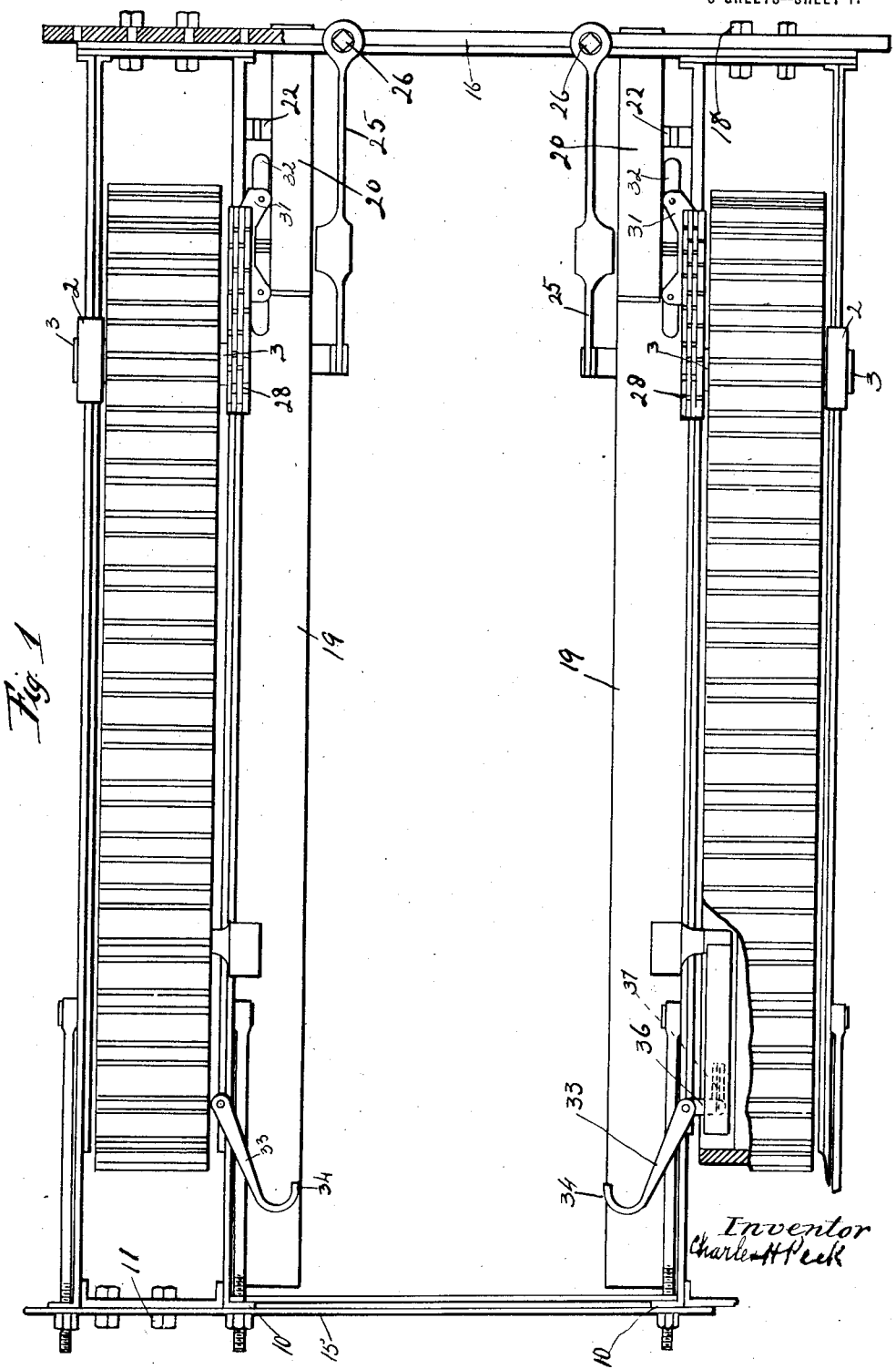
Figure 1, is a plan view of my improved tractor.

In carrying out my invention as here embodied, 1 represents the frame of the self-laying track units there being two of these units of the same construction. These frames are composed of two side members which carry the journal boxes 2 in which are journaled the axle 3 of the drive wheel 4, said wheel being rigid upon said axle.

5 represents extension bars which project forward from each side of each frame, each bar having a slot 6 formed therein in which the axles 7 are fitted to slide and on these axles are mounted the forward wheels 8. The rods 9 are coupled to each end of the axles 7 and pass through the flanges 10 of the bars 5 and have threaded thereon the nuts 11 by which means the front wheel of each crawler member may be adjusted to take up the slack in the self-laying track 12, which self-laying track passes around both the drive wheel 4 and the front wheel 8 and is sprocketed thereto in any suitable manner so that the revolving of the drive wheel 4 causes the self-laying track to travel at the same time revolving the front wheel 8; suitable idle wheels 13 are journaled in the frame at 14 so as to form a rolling tread for the self-laying track.

The two units consisting of the frames 1 and the parts carried thereby are adjustably secured together by the front bar 15 and the rear bar 16 each having multiple holes therein for the passage of the bolts 17 and 18 respectively in order that the tractor may be widened to accommodate different width automobiles.

Upon the inside of each of the frames 1 is secured a track 19 here shown in the shape of an angle iron and these tracks are for the purpose of running the automobile on the tractor. At the rear end of each of these tracks is located an incline 20 pivoted at 21 to the inside of the frame 1 and having connected therewith a toggle joint 22 by means of which it is held in its lowered position shown in Fig. 3 in order that the wheels 23 of an automobile may pass up these inclines on the tracks 19.

24 represents a bracket projecting up from each of the tracks 19 each post having pivoted thereto a supporting lever 25 adapted to pass under the rear axle of the automobile supporting the same when said automobile has been properly coupled up with the tractors. In order that these supporting levers 25 may be adjustable, set screws 26 are threaded through their rear end the lower ends of the screws bearing upon the rear bar 16.

On the inner end of each of the axles 3 is secured a sprocket wheel 27 each of which is geared by the chain 28 to a sprocket wheel 29 journaled on the arm 30, which arm is pivoted concentric with the axle 3. Carried by each of the sprocket wheels 29 is a star wheel 31 having arms 32 pivoted therein in such manner that when the automobile is in position upon the tractor these arms may be turned between the spokes of the wheel thus connecting said wheel to the driving mechanism with the tractor by which arrangement the power plant of the automobile is utilized for driving the tractor.

In order that the steering gear of the automobile may be utilized for guiding the tractor, I provide clutch levers 33 each of which is pivoted to the frame of one of the track units and terminates in the hook 34 into which the front wheels 35 of the automobile pass when said automobile is run into position upon the tractor so that the turning of these wheels in the usual manner of steering operates these clutch levers. Each of these clutch levers has an arm 36 to which a link 37 is pivoted, said link in turn being pivoted at 38 to the toggle links 39 of the clutch segments 40. By this arrangement when the clutch levers are operated by the front wheels of the automobile one or the other of the clutches will be brought into action upon this particular tractor wheel 8 retarding the rotation of said wheels causing the tractor to turn in that direction.

From the foregoing description the operation of my improvement is as follows:—

The bar 16 being removed from the rear of the tractor, an automobile is driven up the inclines 20 on to the tracks 19 so that the front wheels will pass into the hook ends of the clutch levers after which the supporting levers 25 are elevated, the bar 16 replaced and lifted in position, the screws 26 adjusted so as to bring the supporting bars into firm contact with the ends of the rear axle of the automobile. The arms 32 of the star wheels are next turned into contact with the hubs and spokes of the rear wheels of the automobile so as to bring the sprocket wheel 29 into alinement with the center of these hubs when by breaking the toggle joints 22 and elevating the inclines 20 from the ground the rear wheels of the automobile will be freed from the surface of the inclines 20 and the tractor will be ready for use.

When the tractor is not in use the automobile may be run therefrom.

Of course I do not wish to be limited to the exact details of construction as herein shown as these may be varied within the appended claims without departing from the spirit of my invention.

Having thus fully described my invention, what I claim as new and useful is:—

1. In a tractor, two crawler units, bars for adjustably securing the units together, a track rigidly secured to the inside of each of the units, inclines pivoted to each of the crawler units in such manner that the inner ends of said inclines will register with the rear ends of the tracks when the outer ends of said inclines are lowered, and toggle levers for locking the inclines in their operative positions.

2. A tractor consisting of crawler units each composed of wheels and a self-laying track, said units carrying steering mechanism, means for adjusting said units relative to each other, means adapted to mount an automobile upon said tractor, means adapted to connect the drive mechanism of the automobile with the drive mechanism of said tractor, and means adapted to connect the steering mechanism of said automobile with the steering mechanism of said tractor.

3. In a tractor, two crawler units adjustably connected together at their front and rear ends, a track secured to each of the units adapted to support an automobile, pivoted inclined members adapted to guide the wheels of the automobile to said tracks, toggle joints for locking said inclined members in their operating positions, supporting levers adapted to sustain the rear axle of the automobile, means adapted to couple the rear wheels of the automobile to the drive wheels of the crawler units, clutch levers adapted to enter into engagement with the forward wheels of the automobile, and means operated by said clutch levers for steering the tractor.

4. In a tractor, two crawler units, means for adjustably connecting said units together, a track carried by each of the crawler units adapted to support an automobile, inclines pivoted to the crawler units adapted to guide the automobile to the tracks, means for throwing said inclines out of action, a star wheel geared to each of the rear wheels of each of the crawler units, means adapted to connect said star wheels to the rear wheels of the automobile, means adapted to support the rear axle of the automobile, clutch levers having hooked ends adapted to engage the front wheels of the automobile, and clutches to which said clutch levers are connected, said clutches being adapted to retard the rotation of the front wheels of the crawler units.

In testimony whereof, I have hereunto affixed my signature.

CHARLES H. PECK.